United States Patent Office 3,115,445
Patented Dec. 24, 1963

3,115,445
CONTROL OF A DISTILLATION COLUMN WITH PLURAL HEATING MEDIA
Louis D. Kleiss and Stephen J. Murray, Borger, Tex., assignors to Phillips Petroleum Company, a corporation of Delaware
Filed Dec. 27, 1960, Ser. No. 78,463
8 Claims. (Cl. 202—160)

This invention relates to a heating process and apparatus therefor. In one aspect, it relates to a heating process and apparatus therefor in which two sources of heating media are available, one of which is more costly than the other. In another aspect it relates to a method and apparatus for use in providing reboiling heat control to a fractional distillation operation in which more than one source of heat is employed.

In chemical manufacturing plants and particularly in oil refineries and hydrocarbon processing plants, many hot process streams are available for heat exchange purposes. Some of these streams are uniform in flow and/or in temperature, while others vary or are irregular in flow and/or in temperature. In such plants much heating is done with steam when other and less expensive sources of heat are not available. To employ hot process streams for heating other streams serves a double purpose; first, cheap heat is available for use; and second, plant cooling water is conserved.

In the present case hot plant process streams are available for supplying heat for another process or processes, thereby reducing the steam requirement and assisting in reducing plant operating costs.

An object of this invention is to provide a method and apparatus for utilizing available heat from hot process streams for heating other process steps. Another object of this invention is to provide a method and apparatus for utilizing available heat from process streams for the operation of fractional distillation column reboilers to reduce steam requirements. Another object of this invention is to provide process control and apparatus for utilizing available heat from a hot process stream of variable flow and variable temperature and from a process stream of uniform temperature and uniform flow. Still another object of this invention is to provide a method and apparatus for utilizing process stream heat for providing the major portion of the heat to fractional distillation columns and employing steam for product composition control purposes. Yet another object of this invention is to provide a control method and system capable of supplying a regulated amount of heat from the most economical of two unlike heating media. Still other objects and advantages of this invention will be realized upon reading the following description which, taken with the attached drawing, forms a part of this specification.

Figure 1:
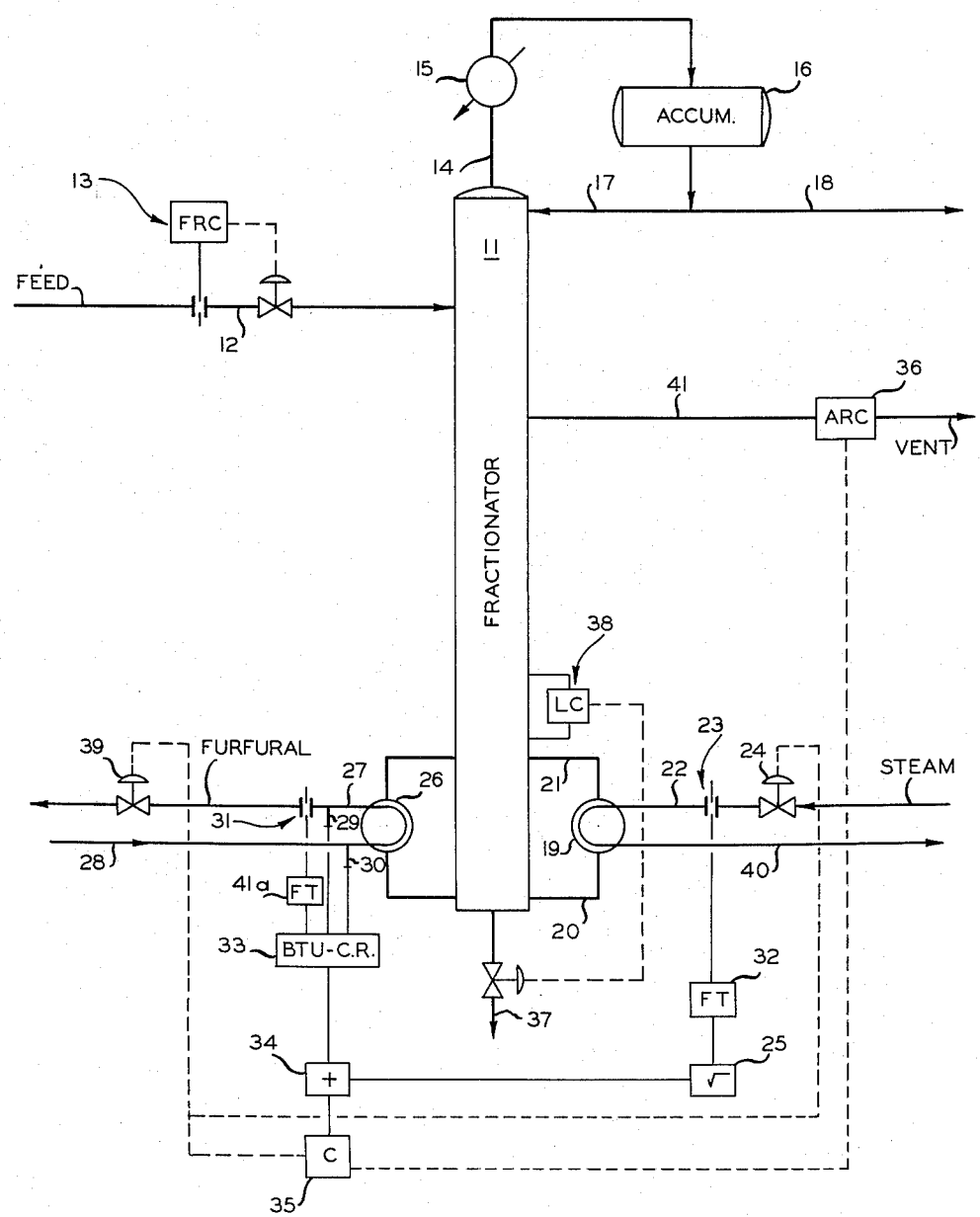
Figure 2:
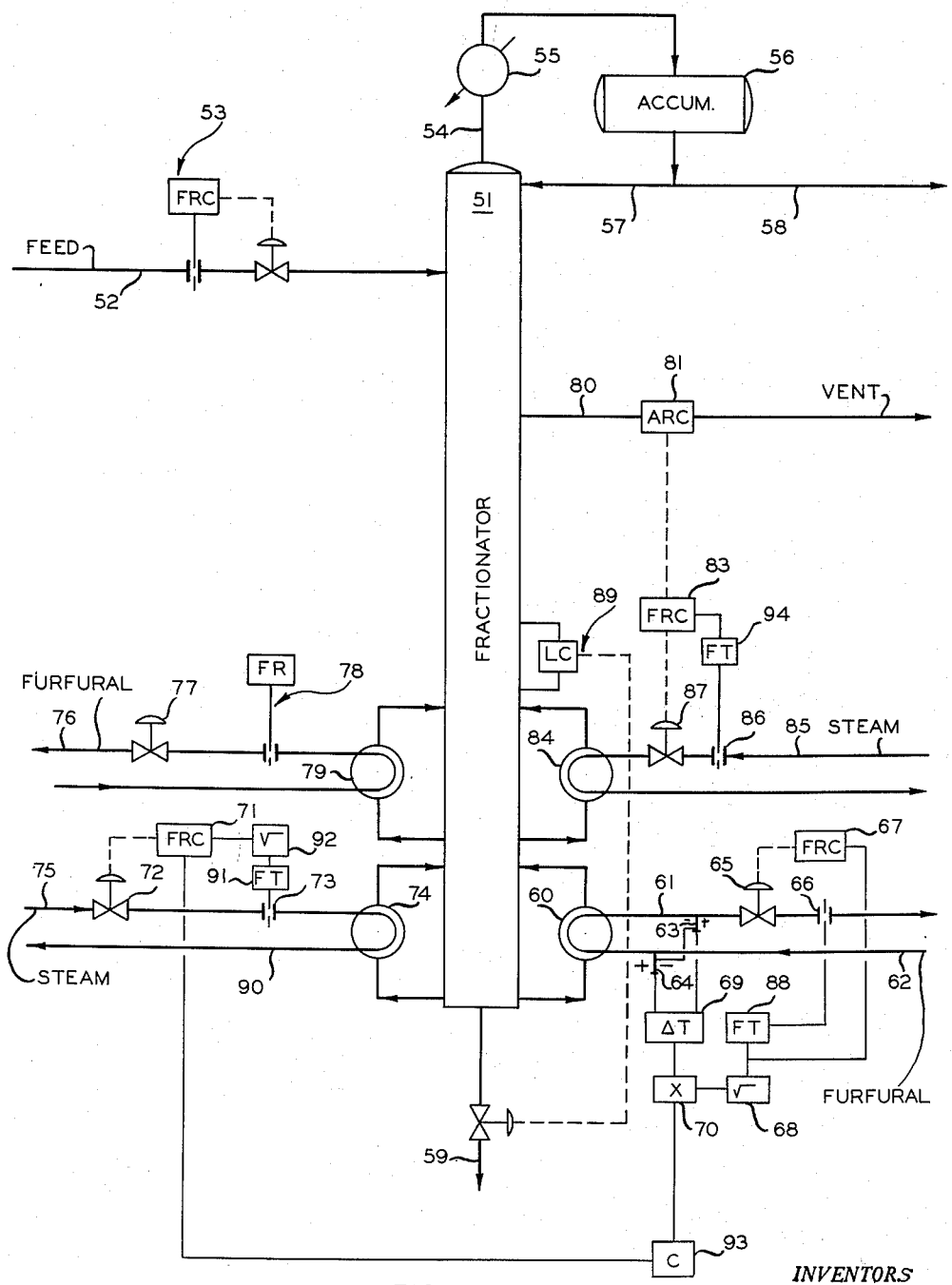

In the drawing FIGURE 1 illustrates, in diagrammatic form, one arrangement of apparatus parts for carrying out the process of this invention. FIGURE 2 illustrates in diagrammatic form another arrangement of apparatus parts for carrying out the process of this invention.

This invention provides a method of operating a fractional distillation column wherein feed and reflux are introduced into the column at substantially constant rates comprising providing reboiling heat for said column by passing first and second heating fluids in indirect heat exchange with liquid kettle contents of said column, measuring the heat supplied to the column from each of the two heating fluids and combining these measurements into a sum representing total heat input, withdrawing a sample of fluid in process from a selected control point of said column, analyzing the withdrawn fluid for content of a key component, regulating the total reboiling heat input so as to hold a predetermined concentration of key component at the selected control point, and a selective fluid throttling system which utilizes all available heat from the first heating fluid before admitting the second heating fluid into the column heat exchanger.

As an illustration of the principles involved in the practice of this invention, we will describe apparatus and a process for fractionating a butadiene-containing hydrocarbon stream produced in the catalytic dehydrogenation of butenes. Such a process stream contains in addition to butadiene, butane, butene-1 and butene-2 (both high boiling and low boiling), lower boiling hydrocarbons and higher boiling hydrocarbons than those mentioned formed in the catalytic dehydrogenation of the butane and/or butenes. Such feed material is passed through a conduit 12 into a fractional distillation column 11. The rate of flow of this feed material is regulated by a rate of flow controller 13 which can be a rate of flow controller Model 58 available from the Foxboro Company, Foxboro, Massachusetts. Other rate of flow controllers hereinafter mentioned can be, if desired, the same Model 58 as just mentioned. The fractional distillation column 11 is provided with a conduit 14 for withdrawal of overhead vapors. A condenser 15 and an accumulator 16 are provided, respectively, for condensing condensable material from the overhead vapors and accumulation of condensate. That portion of the condensate required for refluxing purposes is reintroduced into the column through a conduit 17 while the remainder is passed through a conduit 18 as a product for subsequent use as desired. A conduit 37 is provided at the bottom portion of the column for withdrawal of bottoms product. The bottoms product is withdrawn through conduit 37 in response to the operation of a liquid level controller assembly 38. Liquid level control assemblies are very common in the distillation art and therefore will not be described in detail. An exterior reboiler 19 is provided, as illustrated, for transferring heat from a hot stream of steam flowing through a conduit 22. Liquid from the kettle section of the column 11 is withdrawn therefrom through a conduit 20, passed through heat exchanger 19 and returned to the column through a conduit 21. The rate of flow of steam in conduit 22 is regulated by a motor valve 24. A flow sensing means 23, such as an orifice plate assembly, is provided for sensing the rate of flow of heating steam in conduit 22. Operatively connected with the orifice plate assembly 23 is a flow transmitter 32 which can, if desired, be a Foxboro DP cell. In such a flow transmitter the pressure differential as sensed through pressure taps to the orifice plate assembly is converted to a signal proportional to the difference in pressure on opposite sides of the orifice plate. Such a signal is transmitted from the flow transmitter 32 to a square root extractor 25 which can, if desired, be a Minneapolis-Honeywell Sorteberg Force Bridge, as described on page 3 of Catalog C80-1 of this instrument company. This square root extractor emits a signal proportional to the square root of the pressure differential signal received from the flow transmitter 32 and proportional to the flow in conduit 22.

A second heat exchange reboiler 26 is provided as illustrated. A conduit 28 is provided for passage of a hot liquid plant process stream to the exchanger 26, the heat exchanged and partly cooled liquid being withdrawn therefrom though a conduit 27 for such disposal or use as desired. A motor valve 39 is provided in conduit 27 for regulation of the rate of flow of heating liquid therethrough. An orifice plate assembly 31 is provided in conduit 27 for sensing the rate of flow of liquid therein. Resistance thermometer elements 29 and 30 are provided in conduits 27 and 28, respectively, for sensing temperature of the heatant after and before passage through exchanger 26. By a resistance bridge in a B.t.u. computer-recorder apparatus 33, the difference in temperature between the influent and effluent heatant is measured in a form suitable for further computing of the heat flow rate. The orifice plate assembly 31 is connected with flow transmitter 41a which is also connected to this B.t.u. computer-recorder assembly. This B.t.u. computer-recorder assembly can, if desired, be a Foxboro B.t.u. meter, as described in Bulletin TI 25–A–21a of March 20, 1956, of the Foxboro Company, Foxboro, Massachusetts. An electric flow transmitter 41a transforms the pressure differential from the orifice plate assembly 31 to an electrical signal and, if desired, it can be a Foxboro Type 28 electrical flow transmitter, also described in Bulletin TI 25–A–21a. The pneumatic signal emitted by the B.t.u. computer-recorder 33 is proportional to the heat given up by the liquid flowing through the heat exchange reboiler 26 in heating a portion of the kettle contents of column 11. A suitable B.t.u. meter which can be used as meter 33 is one manufactured by Hays Corporation, Michigan City, Indiana, and described in Instrument and Control Systems, September 1960, p. 1532, and in the Hays Corporation General Catalog, Section 59B–913.

The signal emitted by the square root extractor 25, while proportional to the flow of steam through the orifice plate assembly 23, is calibrated to represent the latent heat of the steam passing through the orifice 23. Since it is desired that the steam passing through conduit 22 be condensed on passing through heat exchanger 19, liquid water only is withdrawn from this exchanger through a conduit 40. Thus, all of the available latent heat of condensation of the steam is utilized in this exchanger. The latent heat in terms of B.t.u. available from the steam passing through exchanger 19 is thus proportional to the rate of flow of steam therethrough. The signal proportional to the sensible heat released by the hot liquid in passing through exchanger 26 and the signal from the square root extractor 25, proportional to the latent heat released in exchanger 19, are added together in an adder 34, which can be a Foxboro M–56 Computing Relay as fully described in the Technical Information Brochure 37–A–57A of September 12, 1956, of the Foxboro Company, Foxboro, Massachusetts. This adder 34 emits a signal proportional to the sum of the signals received from the computer 33 and from the square root extractor 25. This emitted signal is received by a controller 35, which emits a signal which is communicated to the motor of the motor valve 39 and to the motor of the motor valve 24. These valves are spring loaded in such a manner that a stronger signal is required to open valve 24 than is required to open valve 39. It is intended that the springs in valves 24 and 39 be of such strength that the signal from controller 35 opens the valve 39 fully before valve 24 starts to open so that the full stream of heating liquid flowing through conduit 28 will be utilized in the heat exchange reboiler 26 before any steam whatever is employed in the reboiler heat exchanger 19. In this manner, full use is made of the process stream flowing through conduit 28 before any steam is used.

For final control of product in this fractional distillation column a conduit 41 is provided for withdrawal of a small stream of material in process for sampling purposes. For example, conduit 41 can be connected with the distillation column at tray 30, counting from the bottom. It is realized by those skilled in the art that conduit 41 can be connected with other trays of the column for control purposes and obtain the same beneficial results. Conduit 41 passes or transfers a small stream of sample from said tray to an analyzer-recorder-controller 36, which can, if desired, be a high-speed chromatograph as described by Phillips Petroleum Company in ISA Journal, May 1960, page 76. This analyzer-recorder-controller is set to determine the concentration of the butadiene in the fluid on the 30th tray of the column which is below the feed tray and in the stripping section with respect to butadiene, and to emit a signal related to the butadiene content thereof.

The signal emitted from controller 36 is transmitted to the controller 35 and the operation resulting from this signal is as follows. Since the butadiene is desired to be removed from the feed material and accumulated in the overhead product, then, upon increasing the heat added to one or both of the reboilers, more of the butadiene will be stripped from the kettle section and passed upward to be included in the overhead product. Thus, the analyzer-recorder-controller 36 emits a signal which is transmitted to controller 35 to manipulate the set point of said controller. Upon an increase in the butadiene content higher than the normal desired butadiene content on said 30th tray, the signal from ARC 36 to controller 35 increases, then the signal from controller 35 to motor valves 39 and 24 also increases. When the signal to motor valves 24 and 39 increases, tending to open the valves, valve 39 opens fully before valve 24 begins to open.

In the reverse manner, in case the butadiene content of the stream flowing through conduit 41 is below the predetermined normal content of butadiene on the 30th tray, the analyzer-recorder-controller 36 emits a signal of decreased intensity thereby causing the signal from controller 35 to valves 39 and 24 to decrease. Thus, by the decrease in signal from controller 35, valve 24 closes fully before valve 39 begins to close.

In this particular case the liquid heat exchange medium passing through conduit 28 is the hot bottoms product from a furfural stripper in which absorbed butadiene has been stripped by fractionation. Thus, the furfural stream is quite hot and provides a major portion of the heat for reboiling column 11. In one instance the furfural flowing through conduit 28 provides about 90 percent of the heat required for reboiling column 11.

While the furfural available through conduit 28 is not particularly uniform in volume or in temperature, the controls herein disclosed are necessary in order to control accurately the heat given to the reboiling section of column 11. This apparatus as herein disclosed relative to FIGURE 1 records in B.t.u. meter 33 (computer-recorder) the heat given up by the hot furfural stream in heat exchanger 26. In case it is desired to obtain a permanent record of the heat given up during condensation of the steam in the reboiler 19, the signal transmitted from square root extractor 25 may also be recorded. In this manner the B.t.u.'s added from the steam in heat exchanger 19 will then be recorded separately.

In FIGURE 2 reference numeral 51 identifies a fractional distillation column similar to column 11 of FIGURE 1. Feed material to be distilled is introduced to column 51 through a conduit 52. A flow recorder-controller assembly 53 is provided for regulation of the rate of flow of feed material to this column. This flow recorder-controller assembly can be similar to that mentioned hereinabove relative to the recorder-controller assembly 13 of FIGURE 1. A conduit 54, condenser 55, accumulator 56, conduits 57 and 58 are provided for removal of overhead vapors, condensation of reflux, and passage of reflux to the column with the excess condensate being withdrawn through conduit 58 for such disposal as desired.

The embodiment illustrated in FIGURE 2 employs a pair of hot process streams originating from other parts of a plant for providing reboiling heat for column 51. A heat exchange reboiler 79 is provided as illustrated and through this exchanger a stream of hot furfural from a previous point in the plant flows through a conduit 76; this stream of hot furfural is regulated manually by a manually operative control valve 77. For a permanent record of the rate of flow of hot furfural in conduit 76, a flow recorder assembly 78 is provided as illustrated. Such flow recorder apparatus is very common in the distillation art and thus will not be described herein for purposes of brevity. This stream of furfural available for passage through conduit 76 is uniform in temperature and its rate of flow is regulated to be uniform by the manual setting of valve 77, so that the B.t.u.'s of heat given up by the furfural in exchanger 79 are quite constant. This stream of furfural provides a sizable proportion of the reboiling heat for this column. Automatic controls are not necessary on this stream of furfural because its flow and temperature are constant. Thus, other streams of heating media are used for control of the operation of the column.

A second stream of hot furfural originating from a source, not shown, flows through a pipe 62, through a reboiler heat exchanger 60 and is withdrawn therefrom through a conduit 61 for subsequent use as desired. This stream of furfural is variable as regards both quantity and temperature. A flow recorder-controller apparatus 67 is connected with a motor valve 65 for regulation of the rate of flow of furfural through conduit 61. Thermocouples 63 and 64 are provided in conduits 61 and 62, respectively, in the manner illustrated in the drawing. The thermocouples 63 and 64 are connected in series opposition so that the E.M.F. generated by thermocouples 63 opposes the E.M.F. generated by thermocouple 64. The resultant E.M.F. is then proportional to the temperature difference between the heating medium going to exchanger 60 via conduit 62 and from this exchanger via conduit 61. An orifice plate assembly 66 is provided in conduit 61 as illustrated, and this orifice plate assembly communicates with a flow transmitter 88 which emits a signal proportional to the differential pressure sensed from the orifice plate assembly. The flow transmitter emits its signal to a square root extractor 68. This flow transmitter 88 and the square root extractor 68 are similar to the corresponding pieces of equipment described relative to FIGURE 1. The signal emitted from the thermocouples 63 and 64 is transmitted to a transducer 69 which is a thermocouple converter or a transducer such as will convert a millivolt signal to a pneumatic pressure signal. Such an instrument is a Model 700T transducer produced by Taylor Instrument Company. The pneumatic signal emitted by the transducer 69 and the signal emitted by the square root extractor 68 are multiplied in a multiplier 70 which in turn emits a signal proportional to the heat given up by the hot furfural in reboiler 60. This multiplier 70 can, if desired, be a Sorteberg Type M force bridge multiplier described in Minneapolis-Honeywell Catalog C80–1, page 4.

Another heat exchanger reboiler 74 is provided in conjunction with column 51 for supplying additional reboiling A stream of steam is passed through a conduit 75, through reboiler 74 and the condensate therefrom is withdrawn through a conduit 90, as illustrated. In exchanger 74 it is intended that the steam from conduit 75 be completely condensed and its latent heat of condensation be employed in this reboiling step. A motor valve 72 regulates the rate of flow of steam in conduit 75, while an orifice plate assembly 73 senses the rate of flow of this steam. The orifice plate assembly 73 communicates with a flow transmitter 91 which emits a signal proportional to the differential pressure sensed from the orifice plate assembly. The flow transmitter 91 emits its signal to a square root extractor 92 which emits its signal to a flow recorder-controller 71 having a set point for regulation of the motor valve 72. In usual practice, this flow recorder-controller is so set that the heat supplied by the steam in exchanger 74 provides about 10 percent of the combined heat supplied by exchangers 74 and 60. In other words, it is intended in this embodiment that the sum of the heat supplied by exchanger 60 and by exchanger 74 be as nearly constant as possible. Thus, an increase in heat added by exchanger 60 will result in an equal decrease in heat added by exchanger 74, and vice versa.

The set point of controller 93 is the desired sum of heat rate inputs to be supplied by reboilers 60 and 74 and is set above the expected random heat input through reboiler 60. The input signal to controller 93 is the output signal of multiplier 70, representing the heat given up by hot furfural in reboiler 60. Controller 93 is a proportional type controller in which the output is proportional to the difference between the set point and the input signal, in this case the output being the required rate of heat input through reboiler 74. The output signal from controller 93 manipulates the set point of the steam flow recorder-controller 71 to hold the sum of heats added by reboilers 60 and 74 at a constant rate.

For ultimate control of quality of desired products, a conduit 80 is provided for withdrawing a sample from a predetermined level of column 51. As mentioned relative to column 11 of FIGURE 1, conduit 80 can, if desired, be connected for withdrawal of sample from the 30th tray of the column. Sample from conduit 80 is passed into an analyzer-recorder-controller 81. This analyzer-recorder-controller can, if desired, be similar to that mentioned above relative to FIGURE 1. Since butadiene is the material being recovered as overhead product in this particular process, it is the material herein called the light key component. Thus, the analyzer-recorder-controller 81 analyzes the stream from conduit 80 for its butadiene concentration. Still another reboiler heat exchanger 84 is provided as illustrated. Steam enters this heat exchanger from a conduit 85, with the flow thereof being sensed by an orifice plate assembly 86 and controlled by motor valve 87. The pressure differential across the orifice plate of assembly 86 is sensed in flow transmitter 94 which sends a signal to flow recorder-controller 83 which, in co-operation with the set point thereof, regulates motor valve 87. The analyzer-recorder-controller 81 communicates with the flow recorder-controller 83 in such a manner as to manipulate the set point of this latter instrument in response to the butadiene content as determined by the analyzer-recorder-controller. For illustrative purposes this column is stated as being utilized for removing butadiene from the feed material with the butadiene leaving the column in the overhead product through conduit 58. In this manner, it is desired that the butadiene concentration in the kettle product, withdrawn through a conduit 59 as regulated by a liquid level controller assembly 89, be very minor. As is known in the distillation art, when a fractional distillation column is operating normally and uniformly the concentration of the light key component on any given tray of the column is substantially constant. Thus, in normal operation the concentration of butadiene withdrawn in sample conduit 80 will be the same as the desired set point of analyzer-recorder-controller 81.

Upon increase in the concentration of butadiene, as determined by the analyzer-recorder-controller 81, above the desired set point concentration of butadiene at this level of the column, additional reboiling heat must be added to the column to reduce the butadiene concentration to its desired concentration. Thus, upon increase of the butadiene concentration of said sample above the set point, the analyzer-recorder-controller emits a signal related to the increased concentration to the flow recorder-controller 83 which manipulates its set point resulting in further opening of motor valve 87 for admission of a larger quantity of steam to reboiler 84. In this manner, with the additional steam, reboiling is increased and stripping of butadiene from the liquid in the kettle section of the column is expedited with the result that the butadiene concentration on all the trays below the feed entry tray is reduced to some extent. This reduction of butadiene concentration is soon realized in further samples removed through conduit 80 to the analyzer-recorder-controller 81.

The steam flowing through conduit 85 for this final control of product composition is also intended to be completely condensed in exchanger 84 so that its latent heat will be fully utilized. However, if desired, superheated steam can be employed in exchanger 84 since this exchanger is used only for final composition control and is not involved in any manner with the other controls of reboiling heat input as described above. The amount of the heat provided by the steam in the exchanger 84 amounts ordinarily to a maximum of about 10 percent of the reboiling heat added to the column.

In the general operation of the process as illustrated in FIGURE 2, heat exchangers 60 and 74 provide nearly all of the reboiling heat not provided by the constant temperature and constant flow of furfural through exchanger 79. Since the sum of the heats added to the column in exchanger 60 and in exchanger 74 is constant and the heat added by reboiler 79 is constant, then the heat from the condensation of the steam in reboiler 84 regulates final product composition.

The following data, showing the composition of a feed stream, overhead product and bottoms product produced in a fractional distillation operation using the heat exchange control herein disclosed, illustrate the operation of the process of FIGURE 2.

| Component | Composition, Mol Percent | | |
|---|---|---|---|
| | Feed | Overhead Product | Bottoms |
| Propane | 0.2 | 0.3 | |
| Isobutane | 0.3 | 0.8 | |
| Normal butane | 5.0 | 5 | 4.6 |
| Isobutylene | 0.4 | 1 | |
| Butene-1 | 25 | 52 | |
| Butene-2 (L.) | 28 | 6.5 | 49 |
| Butene-2 (H.) | 21 | 0.4 | 42 |
| Butadiene | 17.7 | 34 | .4 |
| Neopentane | 1.5 | | 4 |
| | 100.0 | 100.0 | |
| Flow rates, g.p.h. | 17,000 | 9,000 | 8,000 |
| Pressure, p.s.i.g. | | 85 column overhead | |
| Temperature, °F | 150 | 130 | 161 |
| Av. furfural rate, g.p.h., through reboilers | | | 190,000 |
| Av. Δ T hot furfural, °F | | 115 | |
| Sp. Ht., hot furfural | | 0.42 cal./gm./°C. | |
| Steam flow rate, lbs./hr | | 30,000 | |
| Location of ARC 81 sample point | | 30th tray (from bottom) | |
| Desired analysis | | 4% butadiene | |

While certain embodiments of the invention have been described for illustrative purposes, the invention obviously is not limited thereto.

We claim:
1. A method for operating a fractional distillation zone wherein feed and reflux are introduced into said zone at substantially constant rates and heat exchange mediums supply reboiling heat to the liquid kettle contents of said zone comprising providing one portion of the reboiling heat for said zone by passing a hot heat exchange liquid in indirect heat exchange with liquid kettle contents of said zone, sensing a temperature difference of said heat exchange liquid on passing through said indirect heat exchange, determining the flow rate of said heat exchange liquid, multiplying said flow rate by the sensed temperature difference and by the specific heat of said heat exchange liquid and thereby obtaining the heating value added to said kettle contents of said zone, providing the remaining portion of the reboiling heat for said zone by condensing steam in indirect heat exchange with liquid kettle contents of said zone, determining the rate of flow of said steam, adding a signal proportional to said heating value added to said kettle contents to a signal proportional to the rate of flow of said steam to obtain a signal proportional to the sum thereof, controlling the rates of flow of said heat exchange liquid and said steam responsive to said signal proportional to the sum in such a manner that said heat exchange liquid flows at its maximum rate prior to passage of said steam in its heat exchange flow, withdrawing a sample of fluid in process from a selected control point of said zone, analyzing the withdrawn fluid for content of a key component, and further regulating the flow of said heat exchange liquid and the flow of said steam in response to said content of said key component.

2. The method of claim 1 wherein said key component is distilled overhead, increasing the flow of one of said heat exchange liquid and said steam in response to a content of said key component in the withdrawn stream greater than a predetermined content thereby producing a bottoms product from said zone having a minimum content of said key component.

3. A method for operating a fractional distillation zone wherein feed and reflux are introduced into said fractional distillation zone at substantially constant rates comprising providing a predetermined rate of heat input to the kettle section of said fractional distillation zone by passing a hot heat exchange liquid in indirect heat exchange with the liquid kettle contents of said zone fractional distillation, sensing the temperature difference of said heat exchange liquid on passing through said indirect heat exchange, determining the flow rate of said heat exchange liquid, multiplying said flow rate by the sensed temperature difference and by the specific heat of said heat exchange liquid thereby obtaining the quantity of heat added to said kettle contents by said heat exchange liquid, providing further heat input to said kettle section by condensing steam in indirect heat exchange with liquid kettle contents of said zone fractional distillation, sensing the rate of flow of said steam, increasing the rate of flow of said steam to the condensing step in response to a decrease in the heat added to said kettle contents by said heat exchange liquid, thereby maintaining the sum of the heat added by said heat exchange liquid and by said steam substantially at a uniform value, withdrawing a sample of fluid in process from a selected control point of said zone fractional distillation, analyzing the withdrawn fluid for content of a key component, adding further reboiling heat to the kettle section of said fractional distillation zone by condensing in a second condensing step steam in indirect heat exchange with liquid kettle contents of said zone fractional distillation, and regulating this latter steam condensing in response to the concentration of said key component in the withdrawn sample.

4. The method of claim 3 wherein said key component is distilled overhead, increasing the flow of steam to the second condensing step in response to an increase in the concentration of said key component in the withdrawn sample of fluid greater than a predetermined content thereby producing a bottoms product having a minimum content of said key component.

5. Apparatus for controlling the operation of a fractional distillation column having an inlet for feed material to be fractionated, a bottoms product outlet, an overhead vapor outlet and means for adding reflux to the upper portion of said column comprising, in combination, a first indirect heat exchange reboiler, first and second conduits communicating with said first reboiler for inlet and outlet, respectively, of a heat exchange liquid, means communicating with said first and second conduits for determining the heat given up by said heat exchange liquid in said first reboiler, a first flow control means in said first conduit, a second indirect heat exchange reboiler, third and fourth conduits communicating with said second reboiler for inlet of steam and outlet of condensed steam, means operatively communicating with said third conduit for determining the rate of flow of steam therein, second flow control means in said third conduit, an adder in communication with said means for determining the heat given up by said heat exchange liquid and with said means for determining the rate of flow of steam, and a controller in operative communication with said adder and with said first and second control means, said adder being adapted to add signals from said means for determining the heat given up by said heat exchange liquid and from said means for determining the rate of flow of steam and to emit a signal proportional to the sum thereof, said controller being adapted to emit signals to said first flow control means and to said second flow control means to actuate same, said column having a sample outlet for withdrawing sample from a selected level of said column, an analyzer communicating with said sample outlet for analyzing a sample of column contents, said analyzer being adapted to emit a signal proportional to the content of a key component in said sample, and said controller being in communication with said analyzer and adapted to regulate said first and said second flow control means in response to said signal from said analyzer, said second flow control means being adapted to open upon an increase of concentration of said key component above a predetermined concentration in a sample analyzed by said analyzer.

6. In the apparatus of claim 5, said second flow control means being adapted to open only after said first flow control means is fully open.

7. Apparatus for controlling the operation of a fractional distillation column having an inlet for feed material to be distilled, a bottoms product outlet, an overhead vapor outlet and means for adding reflux to the upper portion of said column comprising, in combination, first, second and third indirect heat exchange reboilers communicating operably with the kettle section of said column, a firt conduit communicating with the first reboiler for passage of steam thereto, first flow rate controller in operative communication with said first conduit, second and third conduits communicating with the second reboiler for inlet and outlet of heat exchange liquid, a rate of flow sensing means communicating with said second conduit, first and second temperature sensing means operatively in said second and third conduits respectively, said first and second temperature sensing means being connected with each other in such a manner as to sense a temperature differential between liquids in said second and third conduits, a second flow rate controller in said second conduit, a multiplier communicating with said first and second temperature sensing means and with said rate of flow sensing means and being adapted to emit a signal proportional to the product of the rate of flow of fluid in said second conduit and the temperature difference as sensed by said first and second temperature sensing means, said first flow rate controller communicating operatively with said multiplier and being actuated by said signal from said multiplier in such a way that upon increase in the emitted signal from said multiplier indicating an increase in heat given to said second reboiler said first flow rate controller throttles fluid flow in said first conduit, a fourth conduit communicating with said third reboiler for passage of steam thereto, a third flow rate controller in operative communication with said fourth conduit, a fifth conduit communicating operatively with said column at a predetermined level, an analyzer in said fifth conduit for analyzing fluid withdrawn from said level for a key component, said analyzer being in operative communication with said third flow rate controller, and said third controller being adapted to regulate rate of flow of steam in said fourth conduit in response to the concentration of said key component as determined by said analyzer.

8. In the apparatus of claim 7, said third flow rate controller being in communication with said analyzer in such a manner that upon increase in concentration of said key component above a predetermined concentraton said third flow rate controller throttles steam flow in said fourth conduit.

References Cited in the file of this patent

UNITED STATES PATENTS

| | | |
|---|---|---|
| 1,914,921 | Lacy | June 20, 1933 |
| 2,570,066 | Morrow et al. | Oct. 2, 1951 |
| 2,977,289 | Kron | Mar. 28, 1961 |
| 2,995,544 | Bourgeois | Aug. 8, 1961 |
| 3,021,263 | Berger et al. | Feb. 13, 1962 |

OTHER REFERENCES

"Automatic Control," May 1958, vol. 7–8, pages 45–48.

UNITED STATES PATENT OFFICE
CERTIFICATE OF CORRECTION

Patent No. 3,115,445                            December 24, 1963

Louis D. Kleiss et al.

It is hereby certified that error appears in the above numbered patent requiring correction and that the said Letters Patent should read as corrected below.

Column 8, lines 12 and 13, lines 22 and 23, lines 30 and 31, and lines 35 and 36, for "said zone fractional distillation", each occurrence, read -- said fractional distillation zone --.

Signed and sealed this 23rd day of June 1964.

(SEAL)
Attest:

ERNEST W. SWIDER                              EDWARD J. BRENNER
Attesting Officer                                 Commissioner of Patents